US012809037B2

United States Patent

(12) United States Patent
Abe et al.

(10) Patent No.: US 12,809,037 B2
(45) Date of Patent: Nov. 24, 2026

(54) NETWORK MEASUREMENT DEVICE AND DELAY TIME CORRECTION METHOD THEREOF

(71) Applicant: ANRITSU CORPORATION, Kanagawa (JP)

(72) Inventors: Takaya Abe, Kanagawa (JP); Ryoya Oikawa, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 138 days.

(21) Appl. No.: 19/061,167

(22) Filed: Feb. 24, 2025

(65) Prior Publication Data

US 2025/0306214 A1 Oct. 2, 2025

(30) Foreign Application Priority Data

Mar. 29, 2024 (JP) ................................ 2024-056783

(51) Int. Cl.
*G01S 19/37* (2010.01)
*G01S 19/23* (2010.01)
*G01S 19/25* (2010.01)
*G01S 19/29* (2010.01)

(52) U.S. Cl.
CPC .......... *G01S 19/256* (2013.01); *G01S 19/235* (2013.01); *G01S 19/29* (2013.01); *G01S 19/37* (2013.01)

(58) Field of Classification Search
CPC ...... G01S 19/256; G01S 19/235; G01S 19/29; G01S 19/37; G01S 19/23; H04L 43/0852; H04L 43/10; H04L 43/50
See application file for complete search history.

(56) References Cited

FOREIGN PATENT DOCUMENTS

WO WO-2018173795 A1 * 9/2018 ............ G04R 20/02
WO 2020116201 A1 6/2020

* cited by examiner

*Primary Examiner* — Timothy A Brainard
*Assistant Examiner* — Bongani Jabulani Mashele
(74) *Attorney, Agent, or Firm* — McDonald Hopkins LLC

(57) ABSTRACT

A control unit 10 that obtains an offset value and a slope of time information from a global navigation satellite system (GNSS) time reception unit 5 and information from a main body clock 7, from captured data acquired by connecting an output port 11 and an input port 12 in a shortest manner, that corrects the delay time obtained from the captured data by the offset value and the slope of the time information from the GNSS reception unit 5 and the time information from the main body clock 7 by measuring a delay time by a delay measurement unit 3 and acquiring the captured data by a capture unit 4, and that corrects the corrected delay time by a maximum value and a minimum value of the delay time measured by the delay measurement unit 3, is included.

2 Claims, 3 Drawing Sheets

NETWORK MEASUREMENT DEVICE AND DELAY TIME CORRECTION METHOD THEREOF

TECHNICAL FIELD

The present invention relates to a network measurement device that performs various measurements on a network as a device under test (DUT).

BACKGROUND ART

A network is used as the device under test, and the measurement of a delay in the network for each frame in the network under test is performed.

Patent Document 1 discloses a time transmission system that transmits and receives a time synchronization packet between time synchronization devices via transmission device and synchronizes the time of the time synchronization devices based on the time information of the transmission and reception, in which the transmission device measures an in-device delay until the time synchronization packet input to the device itself is output from the device itself, adds the measured in-device delay to a packet subsequent to the time synchronization packet, and corrects the time information added to the time synchronization packet by the in-device delay to synchronize the time.

RELATED ART DOCUMENT

Patent Document

[Patent Document 1] WO 2020/116201

DISCLOSURE OF THE INVENTION

Problem That the Invention is to Solve

However, the in-device delay measured by the transmission device is calculated from the time of an internal clock, but there is a problem in that the time accuracy of the delay measurement is insufficient when the maximum frequency deviation of the internal clock is large.

Therefore, an object of the present invention is to provide a network measurement device capable of improving time accuracy of delay measurement for each frame in a network under test with a configuration in which hardware does not need to be changed and which is simple.

Means for Solving the Problem

A network measurement device of the present invention includes a global navigation satellite system (GNSS) reception unit (5) that acquires time information from radio waves from a GNSS satellite, a main body clock (7) that generates time information according to a frequency at which an oscillator oscillates, a frame generation unit (2) that generates a data frame as a test signal corresponding to a communication standard of a device under test (100) and that transmits the data frame to the device under test from an output port (11) by setting the time information from the GNSS reception unit to a payload of a test signal of the generated data frame, a delay measurement unit (3) that calculates a delay time in the device under test from the time information of the payload of the data frame as a test signal input to an input port (12) from the device under test and a reception time from the time information of the GNSS reception unit and that measures a maximum value and a minimum value of the delay time during a predetermined time, a capture unit (4) that captures the data frame as a test signal input to the input port from the device under test and that stores the data frame as captured data together with the time information from the main body clock, and a control unit (10) that obtains an offset value and a slope of the time information from the GNSS reception unit and the time information from the main body clock, from the captured data acquired by connecting the output port and the input port in a shortest manner, that corrects the delay time in the device under test for each data frame obtained from the captured data by the offset value and the slope of the time information from the GNSS reception unit and the time information from the main body clock by measuring the delay time by the delay measurement unit and acquiring the captured data by the capture unit, and that corrects the corrected delay time by the maximum value and the minimum value of the delay time measured by the delay measurement unit.

With this configuration, the delay time in the device under test for each data frame is obtained from the captured data acquired by the capture unit, a correction is performed by a difference between the time information from the GNSS reception unit and the time information from the main body clock and a deviation by an elapsed time of the time information of the main body clock, and further, a correction is performed by the maximum value and the minimum value of the delay time measured by the delay measurement unit. Therefore, the time accuracy of the delay measurement for each frame in the network under test can be improved.

In addition, a delay time correction method of a network measurement device according to the present invention including a global navigation satellite system (GNSS) reception unit (5) that acquires time information from radio waves from a GNSS satellite, a main body clock (7) that generates time information according to a frequency at which an oscillator oscillates, a frame generation unit (2) that generates a data frame as a test signal corresponding to a communication standard of a device under test (100) and that transmits the data frame to the device under test from an output port (11) by setting the time information from the GNSS reception unit to a payload of a test signal of the generated data frame, a delay measurement unit (3) that calculates a delay time in the device under test from the time information of the payload of the data frame as a test signal input to an input port (12) from the device under test and a reception time from the time information of the GNSS reception unit and that measures a maximum value and a minimum value of the delay time during a predetermined time, and a capture unit (4) that captures the data frame as a test signal input to the input port from the device under test and that stores the data frame as captured data together with the time information from the main body clock, includes obtaining an offset value and a slope of the time information from the GNSS reception unit and the time information from the main body clock, from the captured data acquired by connecting the output port and the input port in a shortest manner, correcting the delay time in the device under test for each data frame obtained from the captured data by the offset value and the slope of the time information from the GNSS reception unit and the time information from the main body clock by measuring the delay time by the delay measurement unit and acquiring the captured data by the capture unit, and correcting the corrected delay time by the maximum value and the minimum value of the delay time measured by the delay measurement unit.

With this configuration, the delay time in the device under test for each data frame is obtained from the captured data acquired by the capture unit, a correction is performed by the difference between the time information from the GNSS reception unit and the time information from the main body clock and the deviation by the elapsed time of the time information of the main body clock, and further, a correction is performed by the maximum value and the minimum value of the delay time measured by the delay measurement unit. Therefore, the time accuracy of the delay measurement for each frame in the network under test can be improved.

Advantage of the Invention

The present invention can provide a network measurement device capable of improving time accuracy of delay measurement for each frame in a network under test with a configuration in which hardware does not need to be changed and which is simple.

BEST MODE FOR CARRYING OUT THE INVENTION

Hereinafter, a network measurement device according to an embodiment of the present invention will be described in detail with reference to the drawings.

Figure 1:
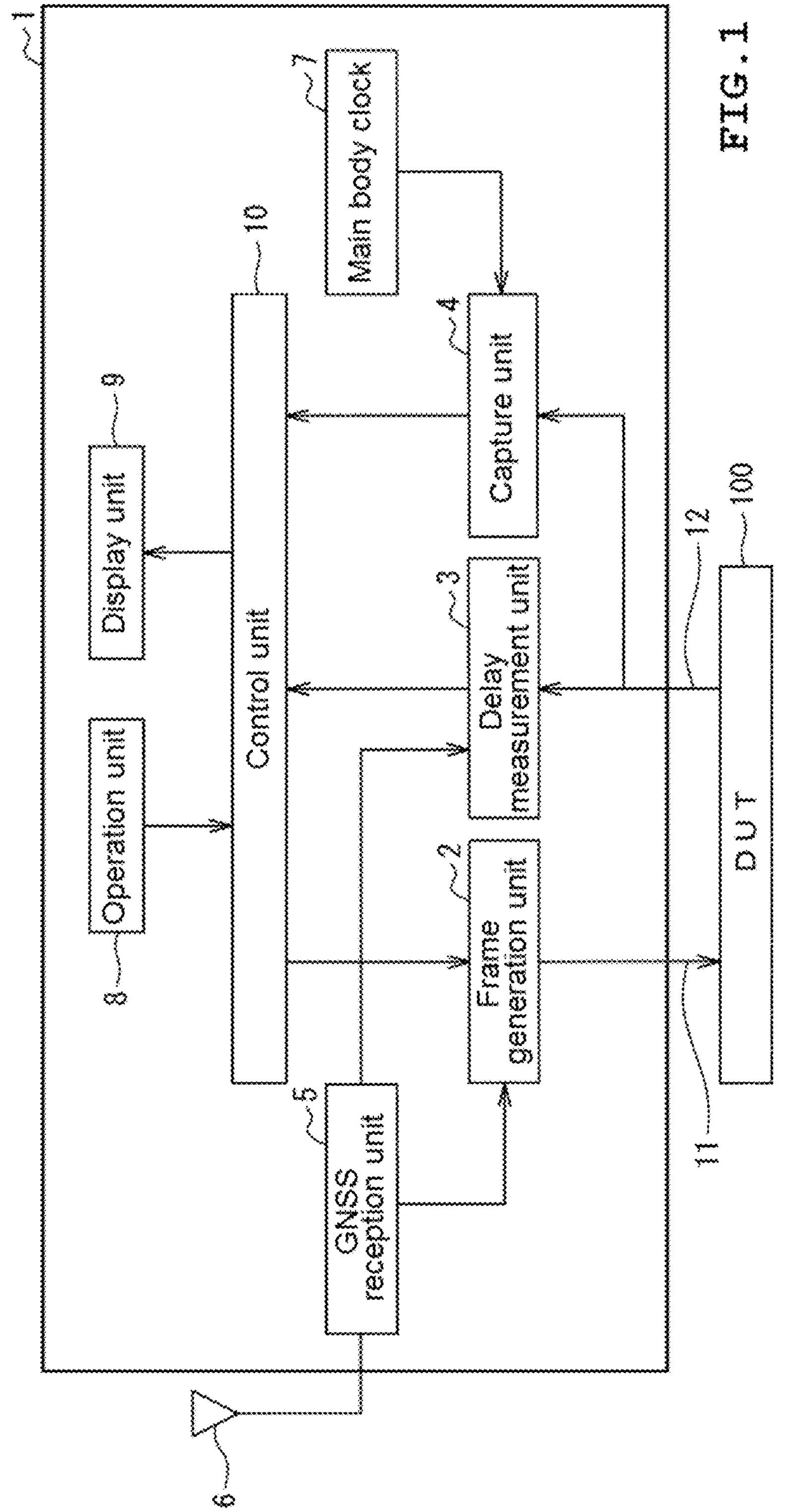
FIG. 1 is a block diagram of a network measurement device according to an embodiment of the present invention.

In FIG. 1, a network measurement device 1 according to an embodiment of the present invention is connected to a network as a DUT 100 in a wired manner via an Ethernet (registered trademark) cable or the like, and performs a measurement test of the DUT 100.

The network measurement device 1 includes a frame generation unit 2, a delay measurement unit 3, a capture unit 4, a GNSS reception unit 5, a GNSS antenna 6, a main body clock 7, an operation unit 8, a display unit 9, and a control unit 10. In the present embodiment, for example, a global positioning system (GPS) will be described as the GNSS. As the GNSS, Galileo, BeiDou, GLONASS, or the like can also be used.

The frame generation unit 2 generates a data frame as a test signal corresponding to the communication standard of the DUT 100, and transmits the test signal of the generated data frame to the DUT 100 from an output port 11.

The delay measurement unit 3 receives a data frame as a test signal input to an input port 12 from the DUT 100 and measures a delay in the DUT 100 from the received data frame.

The capture unit 4 captures the data frame as a test signal input to the input port 12 from the DUT 100 and stores the data frame as captured data.

The GNSS reception unit 5 receives radio waves from a GNSS satellite via the GNSS antenna 6, acquires a current time from information included in the received radio waves, and outputs the current time to the frame generation unit 2 and the delay measurement unit 3.

The main body clock 7 generates time information by using, for example, a temperature compensated crystal oscillator (TCXO) and outputs the time information to the capture unit 4.

The operation unit 8 is configured with, for example, an input device such as a keyboard, a mouse, and a touch panel, and outputs information or the like, which is input by the operation, to the control unit 10.

The display unit 9 is configured with, for example, an image display device such as a liquid crystal display, and displays an image for inputting information necessary for setting a measurement, an image illustrating a state during the measurement, or the like.

The control unit 10 is configured with, for example, a computer unit that includes a central processing unit (CPU), a random access memory (RAM), a read only memory (ROM), a flash memory, a hard disk device, an input port, and an output port.

In the computer unit, for example, the CPU executes an operating system (OS) stored in the hard disk device, so that the CPU can control devices connected to the input port and the output port.

The network measurement device 1 measures a delay time for each data frame as a delay measurement of the DUT 100, and outputs, for example, a maximum value, a minimum value, and an average value for each second.

For example, when the delay measurement is selected by an operation input to the operation unit 8, the control unit 10 instructs the frame generation unit 2 to generate and transmit a data frame as a test signal, and instructs the delay measurement unit 3 to perform the delay measurement.

The frame generation unit 2 generates a data frame as a test signal and transmits the data frame to the DUT 100 by setting a time from the GNSS reception unit 5 as a transmission time in a payload.

The delay measurement unit 3 calculates a difference between a transmission time set in the payload of the data frame received from the DUT 100 and a reception time by the time from the GNSS reception unit 5 as a delay time, and outputs a maximum value, a minimum value, and an average value of the delay time for each second to the control unit 10.

The control unit 10 displays the data of the delay measurement received from the delay measurement unit 3 on the display unit 9 in a graph or the like.

The delay time is a high-accuracy delay time since both the transmission time and the reception time are calculated from the high-accuracy time from the GNSS reception unit 5.

Here, there is also a demand for measuring the delay time for each data frame, in addition to the maximum value, the minimum value, and the average value within a predetermined time. However, in order to measure the delay time for each data frame, it is necessary to change the delay measurement unit 3. Since changing the delay measurement unit 3 takes time and cost, it cannot be easily performed.

Therefore, in the present embodiment, the delay time for each data frame is measured by using the captured data of the capture unit 4.

However, since the time of the captured data is generated by the TCXO of the main body clock 7, the maximum frequency deviation is about several ppm, with the actual value being 1 ppm or less, and the time accuracy of the delay measurement is insufficient.

In the present embodiment, the frequency variation of the main body clock 7 is corrected to improve the accuracy of the delay time from the captured data.

First, data for calibration is prepared. The output port 11 and the input port 12 are connected by an Ethernet cable having the shortest length, for example, about 20 cm, the data frame as a test signal is transmitted, and the capture unit 4 acquires the captured data for about 1 minute.

The calibration data needs to be acquired each time the power of the network measurement device 1 is turned off or the connected interface is changed.

By using the captured data as calibration data, the control unit 10 obtains the delay time for each data frame from the value of a counter for delay measurement, which represents a transmission time in the payload, and a reception time of the data frame of the captured data.

The control unit 10 obtains an average value of the obtained delay time, for example, for each second, and obtains a change (slope) of the average value with respect to the elapsed time.

Since the output port 11 and the input port 12 are connected in the shortest distance, the delay is considered to be almost zero. Therefore, it is considered that a difference between the average value and the minimum value of the measured delay time for each second is an original difference (offset) between the time of the GNSS reception unit 5 and the main body clock 7, and the slope of the average value for each second is the frequency deviation of the TCXO of the main body clock 7.

Thereafter, the DUT 100 to be measured is connected, the data frame as a test signal is transmitted for about 1 minute in the same manner, the delay measurement unit 3 performs the delay measurement, and the capture unit 4 acquires the captured data.

By using the measured captured data, the control unit 10 obtains the delay time for each data frame from the value of the counter for delay measurement, which represents a transmission time in the payload, and the reception time of the data frame of the captured data.

The control unit 10 performs correction subtracting a value corresponding to the offset value and the slope obtained from the calibration data, from the obtained delay time.

Figure 2:
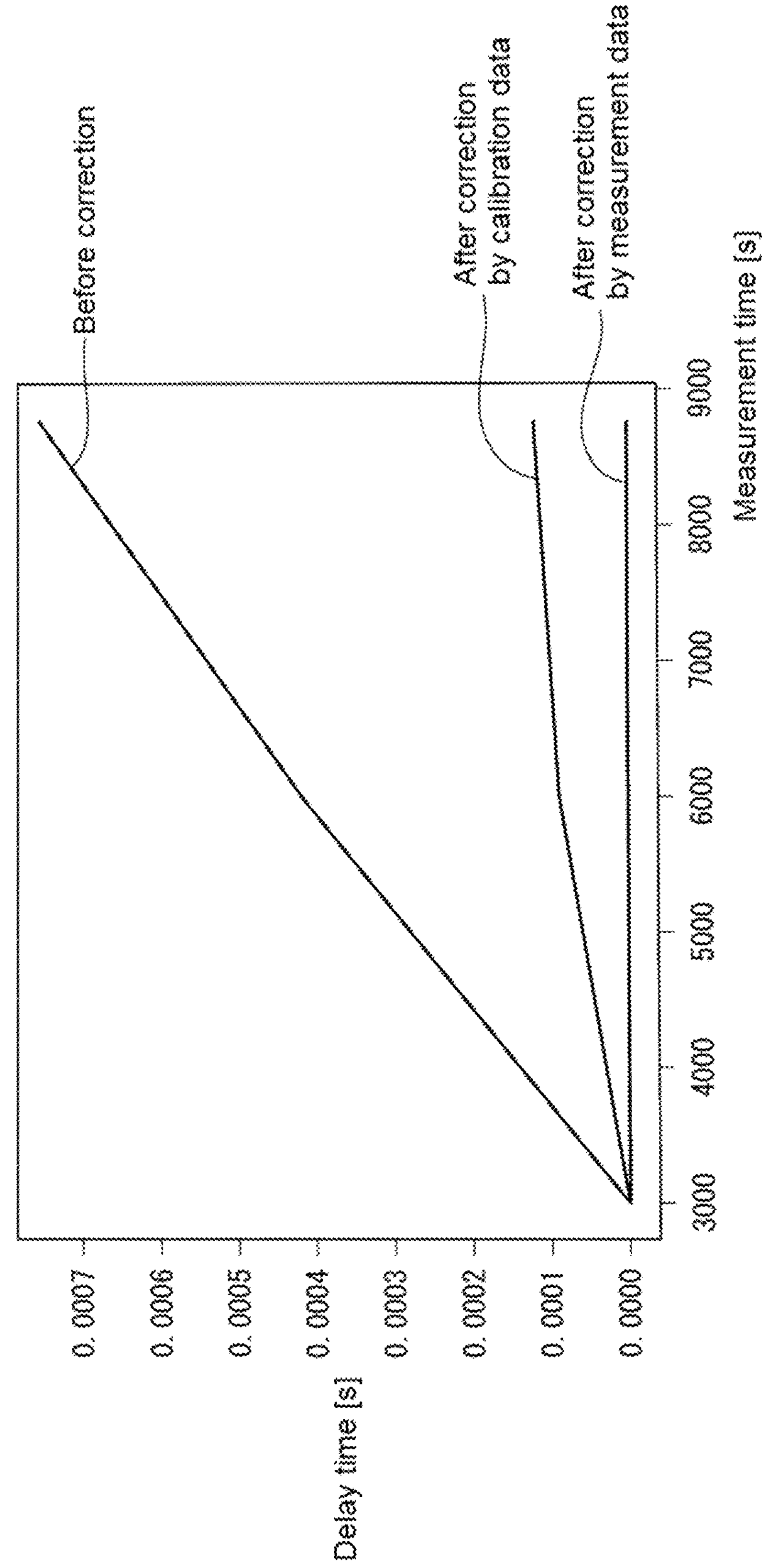
FIG. 2 is a graph illustrating an example of a change in a delay time due to correction of the network measurement device according to the embodiment of the present invention.

As illustrated in FIG. 2, in the measured delay time, for example, the delay time in the data before correction is increased with the passage of time, but the slope thereof is gentle due to the correction by the calibration data.

The control unit 10 performs correction on the delay time corrected by the calibration data by using the actual measurement data measured by the delay measurement unit 3.

The control unit 10 corrects the delay time in one second based on a difference between a maximum value and a minimum value of the actual measurement data in one second and a maximum value and a minimum value of the delay time in one second obtained from the corresponding corrected captured data. The control unit 10 corrects the delay time in one second by, for example, the average value of the difference between the maximum value and the minimum value.

By performing the correction by using such actual measurement data, as illustrated in FIG. 2, it is possible to obtain data of a high-accuracy delay time that is not affected by the measurement time.

Figure 3:
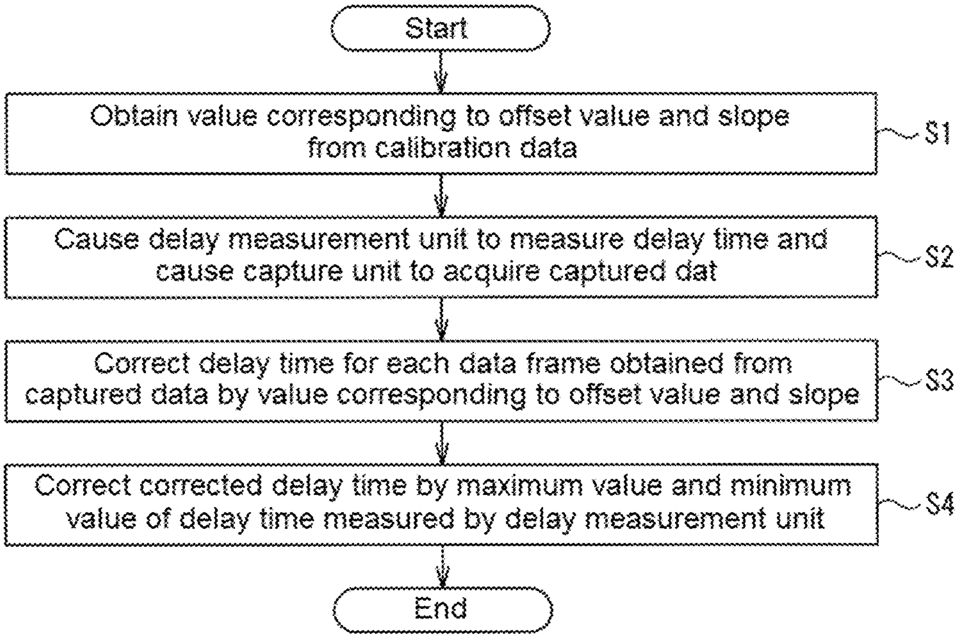
FIG. 3 is a flowchart for describing a procedure of delay time correction process of the network measurement device according to the embodiment of the present invention.

A delay time correction process by the network measurement device 1 according to the present embodiment configured as described above will be described with reference to FIG. 3. The delay time correction process described below is executed when the measurement of the delay time is selected when the user operates the operation unit 8.

In step S1, the control unit 10 obtains a value corresponding to the offset value and the slope from the calibration data. After the process of step S1 is executed, the control unit 10 executes the process of step S2.

In step S2, the control unit 10 causes the delay measurement unit 3 to measure the delay time and causes the capture unit 4 to acquire the captured data. After the process of step S2 is executed, the control unit 10 executes the process of step S3.

In step S3, the control unit 10 corrects the delay time for each data frame obtained from the captured data by the value corresponding to the offset value and the slope. After the process of step S3 is executed, the control unit 10 executes the process of step S4.

In step S4, the control unit 10 corrects the corrected delay time by the maximum value and the minimum value of the delay time measured by the delay measurement unit 3. After the process of step S4 is executed, the control unit 10 ends the delay time correction process.

As described above, in the above-described embodiment, the control unit 10 obtains the delay time in the DUT 100 for each data frame from the captured data acquired by the capture unit 4, performs correction with a value corresponding to the offset value and the slope obtained from the calibration data, and further performs correction with the maximum value and the minimum value of the actual measurement data measured by the delay measurement unit 3.

Accordingly, it is possible to improve the time accuracy of the delay measurement for each frame in the network under test with a configuration in which the hardware does not need to be changed and which is simple.

In the present embodiment, although the measurement is performed by the one network measurement device 1, the same can be done although the two network measurement devices 1 are used as a transmission side and a reception side.

In addition, in the present embodiment, the correction of the delay time, or the like is performed by the control unit 10, but a personal computer may be connected to the network measurement device 1, and the correction of the delay time, or the like may be performed by software of the personal computer.

Although an embodiment of the present invention has been disclosed, it will be apparent that modifications may be made by those skilled in the art without departing from the scope the present invention. All such modifications and equivalents are intended to be included in the following claims.

DESCRIPTION OF REFERENCE NUMERALS AND SIGNS

1 network measurement device
2 frame generation unit
3 delay measurement unit
4 capture unit
5 GNSS reception unit
7 main body clock
10 control unit
11 output port
12 input port
100 device under test (DUT)

What is claimed is:

1. A network measurement device comprising:

a global navigation satellite system (GNSS) reception unit that acquires time information from radio waves from a GNSS satellite;

a main body clock that generates time information according to a frequency at which an oscillator oscillates;

a frame generation unit that generates a data frame as a test signal corresponding to a communication standard of a device under test and that transmits the data frame to the device under test from an output port by setting the time information from the GNSS reception unit to a payload of a test signal of the generated data frame;

a delay measurement unit that calculates a delay time in the device under test from the time information of the payload of the data frame as a test signal input to an input port from the device under test and a reception time from the time information of the GNSS reception unit and that measures a maximum value and a minimum value of the delay time during a predetermined time;

a capture unit that captures the data frame as the test signal input to the input port from the device under test and that stores the data frame as captured data together with the time information from the main body clock; and a control unit that obtains an offset value and a slope of the time information from the GNSS reception unit and the time information from the main body clock, from the captured data acquired by connecting the output port and the input port in a shortest manner, that corrects the delay time in the device under test for each data frame obtained from the captured data by the offset value and the slope of the time information from the GNSS reception unit and the time information from the main body clock by measuring the delay time by the delay measurement unit and acquiring the captured data by the capture unit, and that corrects the corrected delay time by the maximum value and the minimum value of the delay time measured by the delay measurement unit.

2. A delay time correction method of a network measurement device including a global navigation satellite system (GNSS) reception unit that acquires time information from radio waves from a GNSS satellite, a main body clock that generates time information according to a frequency at which an oscillator oscillates, a frame generation unit that generates a data frame as a test signal corresponding to a communication standard of a device under test and that transmits the data frame to the device under test from an output port by setting the time information from the GNSS reception unit to a payload of a test signal of the generated data frame, a delay measurement unit that calculates a delay time in the device under test from the time information of the payload of the data frame as a test signal input to an input port from the device under test and a reception time from the time information of the GNSS reception unit and that measures a maximum value and a minimum value of the delay time during a predetermined time, and a capture unit that captures the data frame as the test signal input to the input port from the device under test and that stores the data frame as captured data together with the time information from the main body clock, the delay time correction method comprising:

obtaining an offset value and a slope of the time information from the GNSS reception unit and the time information from the main body clock, from the captured data acquired by connecting the output port and the input port in a shortest manner;

correcting the delay time in the device under test for each data frame obtained from the captured data by the offset value and the slope of the time information from the GNSS reception unit and the time information from the main body clock by measuring the delay time by the delay measurement unit and acquiring the captured data by the capture unit; and correcting the corrected delay time by the maximum value and the minimum value of the delay time measured by the delay measurement unit.

* * * * *